United States Patent
Tawil et al.

(10) Patent No.: US 6,892,050 B1
(45) Date of Patent: *May 10, 2005

(54) APPARATUS AND METHOD FOR TRANSMITTING TERRESTRIAL SIGNALS ON A COMMON FREQUENCY WITH SATELLITE TRANSMISSIONS

(75) Inventors: Carmen Tawil, Austin, TX (US); Saleem Tawil, Austin, TX (US)

(73) Assignee: Northpoint Technology, Ltd., Portsmouth, NH (US)

( * ) Notice: Subject to any disclaimer, the term of this patent is extended or adjusted under 35 U.S.C. 154(b) by 709 days.

This patent is subject to a terminal disclaimer.

(21) Appl. No.: 09/714,011

(22) Filed: Nov. 16, 2000

Related U.S. Application Data

(63) Continuation of application No. 08/991,265, filed on Dec. 16, 1997, now Pat. No. 6,169,878, which is a continuation of application No. 08/731,244, filed on Oct. 11, 1996, now Pat. No. 5,761,605.

(51) Int. Cl.[7] ............................................. H04B 7/185
(52) U.S. Cl. ...................... 455/12.1; 455/3.02; 455/427
(58) Field of Search .............................. 455/3.01, 3.02, 455/12.1, 13.3, 427, 430, 179.1, 188.1, 272, 447, 561, 562.1; 725/63, 67, 68; 343/878, 879, 893, 840

(56) References Cited

U.S. PATENT DOCUMENTS

| | | | |
|---|---|---|---|
| 5,394,561 A | 2/1995 | Freeburg | |
| 5,444,762 A | 8/1995 | Frey et al. | |
| 5,483,663 A | 1/1996 | Tawil | |
| 5,511,233 A | 4/1996 | Otten | |
| 5,584,046 A | 12/1996 | Martinez et al. | |
| 5,604,508 A | 2/1997 | Atkinson | |
| 5,729,825 A | 3/1998 | Kostreski et al. | |
| 5,761,605 A | 6/1998 | Tawil et al. | |
| 6,169,878 B1 * | 1/2001 | Tawil et al. | ............. 725/63 |
| 6,208,834 B1 * | 3/2001 | Tawil et al. | ............. 455/3.02 |
| 6,519,446 B2 * | 2/2003 | Tawil et al. | ............. 455/3.02 |

FOREIGN PATENT DOCUMENTS

EP     0 597 225 A1     5/1994

OTHER PUBLICATIONS

Rand Corp., Technology Potentials for Satellite Spacing and Frequency Sharing (1968).

(Continued)

*Primary Examiner*—Quochien B. Vuong
(74) *Attorney, Agent, or Firm*—Russell D. Culbertson; The Culbertson Group, P.C.

(57) ABSTRACT

A first antenna (16) at a user location (14) receives signals at a first frequency where the signals are travelling only within a first directional reception range as measured from a centerline (28) of the first antenna (16). The first antenna (16) has its centerline (28) aligned to receive direct broadcast satellite signals transmitted from a satellite in geosynchronous orbit about the earth. A second antenna (18) at the user location (14) receives signals at the first frequency where the signals are travelling only within a second directional reception range as measured from a centerline (30) of the second antenna (18). The second antenna (18) is aligned to receive signals transmitted at the first frequency from a terrestrial transmitting location remote from the user location. A terrestrial transmitter transmits signals at the first frequency and directionally within a terrestrial azimuth range from the terrestrial transmitting location. The terrestrial transmitting location is located with respect to the user location (14) such that the terrestrial transmitter (20) transmits in directions only outside of the directional reception range of the first antenna (16). The satellite (12) is positioned with respect to the user location (14) such that the satellite transmits directional in directions outside of the directional reception range of the second antenna (18).

23 Claims, 2 Drawing Sheets

OTHER PUBLICATIONS

Eur. Radiocom. Comm., Sharing the Band 11.7 Ghz Between ENG/OB and Direct–to–home TV Broadcasting Satellite (ERC Rep. No. 37, 1995).

ITU Radio Regs., Art 27 (1982).

Scheeren, Interface Reduction Techniques for Earth Stations (1988).

Hult, Sharing the UHF Between Space and Terrestrial Services (1970).

Vincenzo Parenti, The First Transmissions in MMDS, Cinescopio (magazine), Oct. 15, 1992, published by Spedizione In ebb. postate Gruppo, Italy.

Dan Collins, Primer on Frequency Coordination Procedures, Manual, Mar. 27, 1989, 20 pages, Issue I, National Spectrum Managers Association.

DIRECTV, Terrestrial Interference in the DBS Downlink Band, Analysis, Apr. 11, 1994, 29 pages, DIRECTV, Inc., El Segundo, California.

C.W. Lundgren and A.S. May, Radio–Relay Antenna Pointing for Controlled INterference with Geostationary Satellites, The Bell System Technical Journal, Dec. 1969, pp. 3387–3422, vol. 48, No. 10, The Bell System, Madison, Wisconsin.

Richard G. Gould, Report #CC–7201, Geostationary Orbit Avoidance Computer Program, Sep., 1972, pp. 1–77, Federal Communications Commission, Washington, D.C.

International Radio Consultative Committee, XIITH Plenary Assembly, Symposium, 1970, pp. 310–325, vol. IV, Part I, International Telecommunication Union, Geneva.

Author unknown, "Frequency Range 29.7 MHz to 105 GHz and Associated European Cable of Frequency Allocations and Utilizations," European Radiocommunications Committee Report 25, 1994.

Author unknown, "Sharing the Band 11.7 GHz–12.5 GHz between ENG/OB and Direct–to–Home TV Broadcasting Satellite," European Radiocommunications Committee Report 37, 1995.

Author unknown, "Point–to–Multipoint Systems Used in the Fixed Service," Recommendation International Telecommunication Union–R F.755–1, 1992–1994.

Author unknown, "MMDS Multichannel Microwave Distribution System," MDS International pamphlet, date unknown.

Bernaudeau, Eric, "Diffusion Multicanal Par Micro–Ondes La France, Fait Bands A Part," publisher and date unknown.

Thil, Jerome, "Le Cable . . . Sans Cable," Technologies Internationales No. 18, 1995.

Brindley, Keith, "The Smallest Dish on Earth," What Satellite, Aug. 1992.

Vines, James K., "MMDS Goes Over the Horizon," publisher and date unknown.

Author unknown, "Propagation Data Required for the Evaluation of Interference Between Station in Space and Those on the Surface of the Earth," Recommendation International Telecommunication Union–R P.619–1, 1986–1990–1992.

Author unknown, "Propagation Data and Prediction Methods Required for the Design of Terrestrial Line–of–Sight Systems," Recommendation International Telecommunication Union–R P.530–6, 1978–1982–1986–1990–1992–1994–1995.

Author unknown, "Frequency Sharing and Coordination Between Systems in the Fixed–Satellite Service and Radio–Relay Systems," International Telecommunication Union, Recommendations of the CCIR, 1990.

European Radiocommunications Committee Decision of 3–7–96 on the Harmonised Frequency Band to be Designated for the Introduction of the Multipoint Video Distribution Systems (MVDS) (ERC/DEC/(96)(05), European Radiocommunications Committee. 1996.

Author unknown, "Propagation Data and Prediction Methods Required for the Design of Earth Space Telecommunication Systems," Recommendation International Telecommunication Union–R P.618–6.

Author unknown, "Propagation Data Required for the Design of Earth–Space land Mobile Telecommunication systems", Recommendation International Telecommunication Union–R P.681–4, 1990–1994–1995–1997–1999.

Author unknown, "Characteristics of Precipitation for Propagation Modeling", Recommendation International Telecommunication Union–R P.837–3, 1992–1994–1999–2001.

"IEEE Standard Test Procedure for Antennas," 1979, STD 1–143, The Institute of Electrical and Electronics Engineers, Inc., New York, New York.

Bernaudeau, Eric, Diffusion Multicanal Par Micro–Ondes La France, Fait Bands A Part (publisher and date unknown).

Thil, Jerome, "Le Cable . . . Sans Cable!," Technologies Internationales, No. 18, 1995.

"TV Distribution in Technology–Neutral Franchisses Using MVDS", by C.G. Wildey, IEE Colloquium on 'MVDS: The Way Forward', Digest No. 1992/078, p. 3/1.6 (authored by an employee of Marconi Electronics Limited).

"Can MM–Wave MVDS be Low Cost?", by S.M. Fenney & I.M. Clarke, IEE Colloquium on MVDS: 'Microwave Video Distribution Systems', Digest No. 1990/023, p. 7–14.

"A 12GHz MVDS Propagation Trial in the Coventry Urban Area", by P.M. Williams, IEE Colloquium on 'MVDS: Microwave Video Distribution Systems', Digest No. 1990/023, p. 5/1–6).

"Microwave Television—The Options", by P. Hope, IEE Colloquium on 'MVDS: Microwave Video Distribution Systems', Digest No. 1990/023, p. 6/1–9, (authored by an employee of Marconi Communications Systems).

"Field Trials of MVDS in the 12 GHz Band", by B. Beech & P. Barber, IEE Colloquium on MVDS: 'Microwave Video Distribution Systems', Digest No.

"Microwave Television", by P. Hope, Electronics & Wireless World, Aug. 1989, at 780–82, (authored by an employee of Marconi Communications System).

"MVDS", by P. Hope, International Broadcast Engineer, May 1989, at 102–04 & 106, (authored by an employee of Marconi Communications System).

"Catv to Broadcast on 12GHz", by Peta Firth, Electronics Times (Oct. 31, 1991).

"Coexistence Between the Terrestrial Transmissions and the Receiving Satellites Functioning at a Frequency Band Ku", (unknown author and date).

* cited by examiner

APPARATUS AND METHOD FOR TRANSMITTING TERRESTRIAL SIGNALS ON A COMMON FREQUENCY WITH SATELLITE TRANSMISSIONS

This application is a continuation of application Ser. No. 08/991,265 filed Dec. 16, 1997, now U.S. Pat. No. 6,169,878, and which was a continuation of application Ser. No. 08/731,244, filed Oct. 11, 1996, now U.S. Pat. No. 5,761,605.

BACKGROUND OF THE INVENTION

This invention relates to devices and methods for broadcasting and receiving data, including digital television signals and voice signals. More particularly, this invention relates to an apparatus and method for providing terrestrial transmissions simultaneously along with direct broadcast satellite transmissions on a common frequency.

Currently, television signals may be received from a satellite in geosynchronous orbit about the earth. The television signals are transmitted from a terrestrial transmitter to the satellite and then retransmitted from the satellite so that the signals can be received by terrestrial receivers within a certain geographic receiving area within a line of sight of the satellite. In addition to television signals, other types of data may also be transmitted to consumers through satellites in geosynchronous orbit.

Direct broadcast satellite service (DBS) refers to satellite transmission of television signals directly for use by individual households or subscribers having the proper signal receiving equipment. The U.S. Federal Communications Commission has dedicated the electromagnetic spectrum from 12.2 gigahertz to 12.7 gigahertz for DBS broadcasting. Numerous signal carriers are located within the DBS spectrum, each carrier carrying several individual television channels. Depending upon the compression technology applied to these signals, literally hundreds of separate channels may be available through DBS. A great benefit of the DBS system as opposed to prior satellite systems is that only a small dish-type antenna is required to receive the DBS signals and the alignment of the receiving dish is not critical. Also, the DBS system will provide high quality reception at any point in the geographic receiving area of a satellite without the expense of land transmission lines such as those required for cable television.

Current regulations require that DBS satellites be separated from each other by at least nine (9) degrees in a geosynchronous arc. The receiving antenna for DBS signals must, therefore, be limited to receiving signals in a directional range measuring plus or minus nine (9) degrees from a centerline of the antenna. Receiving signals in a range wider than the satellite spacing would cause interference by signals transmitted by different satellites on the same frequency.

U.S. Pat. No. 5,483,663 is directed to a system having a receiver arrangement in which DBS and terrestrial signals are received within similar frequency bands. The system shown in the U.S. Pat. No. 5,483,663 may be implemented with a multiple antenna arrangement, or with a single, moveable antenna. In the multiple antenna arrangement, two separate antennas direct the received signals to a common propagation path for processing as if they were received by a single antenna and transmitted from a single location. In the single antenna arrangement, the antenna is movable between a position to receive DBS signals and another position to receive terrestrial signals.

The advantage of the system shown in U.S. Pat. No. 5,483,663 is that local originating signals, whether television signals or other data, may be received simultaneously with DBS signals, and processed with the same equipment as that used to process the DBS signals. The local originating signals may carry local programming which may be received along with the national or regional DBS programming.

However, since the signals received in the system shown in U.S. Pat. No. 5,483,663 are combined or received on the same antenna structure at different points in time, terrestrial and DBS signals on a common frequency cannot be utilized simultaneously.

SUMMARY OF THE INVENTION

It is an object of the invention to provide terrestrially transmitted signals simultaneously with satellite transmitted signals at the same frequency. The invention includes an apparatus and method for providing terrestrial signals simultaneously at a common frequency with satellite signals.

The object of the invention is accomplished by utilizing receiving antennas with a limited directional reception range and transmitting the terrestrial signals in a different range of directions than those in which the satellite signals are transmitted. Two separate receiving antennas feeding two sets of decoding and demodulating processing systems are required for utilizing the received signals. Both receiving antennas are adapted to receive signals only within a particular directional range. The range is measured from a centerline of the particular antenna.

In order to ensure no interference between the satellite and terrestrially transmitted signals, the terrestrial signals are transmitted directionally within a terrestrial azimuth range which is outside the azimuth range in which the satellite signals are transmitted either by a single satellite or multiple satellites. The terrestrial transmission azimuth range is chosen so that it does not include any directions in which the satellite signal receiving antenna must be directed to receive signals from any satellite. In order to cover a large area for local reception, a plurality of terrestrial transmitters are spread out over an area with directional transmission areas overlapping to ensure the terrestrial signals may be received clearly at each location within the desired service area.

These and other objects, advantages, and features of the invention will be apparent from the following description of the preferred embodiments, considered along with the accompanying drawings.

DESCRIPTION OF THE PREFERRED EMBODIMENTS

Figure 1:
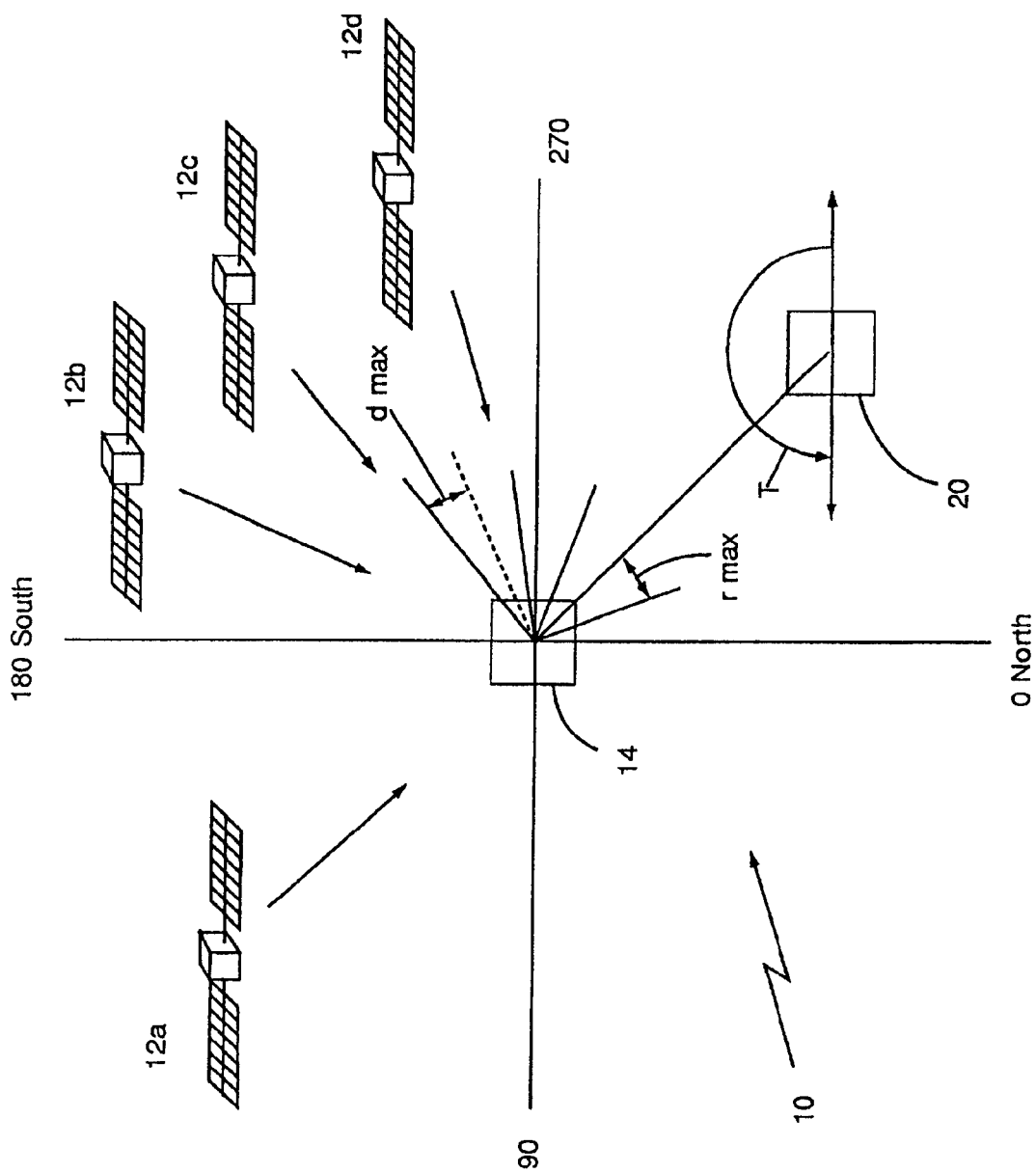
FIG. 1 is a schematic representation showing the positions of a plurality of satellites in relation to a single terrestrial transmitter and a receiver or user location.
Figure 2:
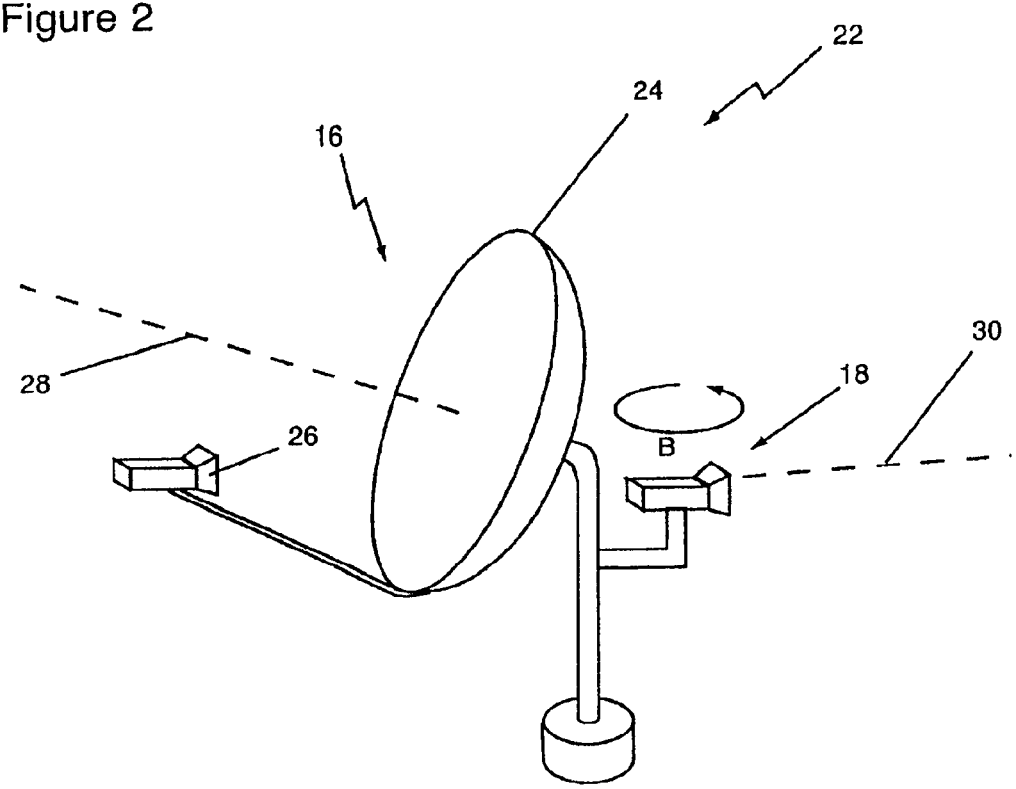
FIG. 2 is a somewhat schematic representation of a receiving antenna structure for receiving satellite and terrestrial transmitted signals at a common frequency.

The apparatus according to the invention for providing terrestrially transmitted signals simultaneously on the same frequency as satellite signals is illustrated in FIGS. 1 and 2.

As shown in FIG. 1, the system 10 may be utilized with one or more satellites in geosynchronous orbit about the earth. FIG. 1 shows four satellites 12a, 12b, 12c, and 12d spaced apart at four separate directions from a user location 14. In geosynchronous orbit, each satellite remains at a fixed location with respect to the earth's surface, and thus, with respect to the user location 14. First and second antenna 16 and 18, respectively, which will be discussed in detail with reference to FIG. 2 are located at the user location 14.

Each of these satellites 12a–d is positioned in geosynchronous orbit about the center of the earth, and is positioned at a certain longitude and latitude above the earth's surface. As is known by those skilled in the art, a receiving antenna may be directed at a certain elevation and direction or azimuth toward a desired satellite location for receiving signals from the particular satellite.

Currently, all direct broadcast satellites within the line of sight of North America are positioned at longitudes and latitudes requiring the receiving antenna to face in a southerly direction from North America to receive signals. Although FIG. 1 shows four satellites 12a–d for purposes of describing the invention herein, more or fewer satellites may be spaced apart within a line of sight of a certain geographical area. Several satellites are currently within a line of sight of North America. Table 1 sets out the longitudinal location of each satellite and for purposes of example, the azimuth and elevation at which a receiving antenna must be directed from a location at Austin, Tex. for receiving signals from each satellite. All azimuth directions and elevations are measured to a centerline of the antenna which will be discussed below with respect to FIG. 2. The term "azimuth" refers to the direction with respect to a reference direction such as due north, commonly zero degrees. "Elevation" refers to the angle of the antenna centerline above horizontal.

TABLE I

| Satellite Longitude | Azimuth | Elevation |
| --- | --- | --- |
| 61.5 | 124.5 | 37.3 |
| 101 | 186.4 | 54.6 |
| 110 | 203.3 | 52.3 |
| 119 | 217.7 | 47.8 |
| 148 | 247.3 | 25.7 |
| 157 | 253.3 | 17.9 |
| 166 | 258.8 | 10.1 |
| 175 | 263.5 | 2.3 |

DBS satellites all transmit different signals in the same frequency band. The U.S. Federal Communications Commission has set aside the electromagnetic spectrum from 12.2 gigahertz to 12.7 gigahertz for DBS broadcasting. In order to ensure no interference from signals between two adjacent satellites, two conditions must be met. First, the receiving antenna must be limited to receive signals only within a certain reception range about the centerline of the antenna. Secondly, the satellites must be spaced apart about the geosynchronous arc so that a receiving antenna may be positioned with only a single satellite transmitting in the directional reception range of the antenna.

According to current regulations, individual DBS satellites must be separated at least nine (9) degrees in the geosynchronous arc. Thus, each DBS receiving antenna must have a directional reception range or aperture of plus or minus nine (9) degrees or less as measured from a centerline of the antenna. Although current regulations require a spacing of no less than nine (9) degrees separation, the invention is not limited to this degree of separation. However, according to the invention, the effective reception range of each first antenna or satellite reception antenna must be less than or equal to the minimum satellite separation angle.

FIG. 1 also shows a terrestrial transmitter 20 capable of transmitting in one or more frequencies identical to a frequency transmitted by one of the DBS satellites. The terrestrial transmitter 20 transmits directionally within a certain transmission range T. The transmission range T shown in FIG. 1 is 180 degrees, although the range may be more or less than this number.

The antenna structure 22 which may be used at user location 14 (FIG. 1) to pick up signals transmitted according to the invention is illustrated in FIG. 2. The first antenna 16 is designed to receive direct broadcast satellite signals. The first antenna 16 includes a collecting dish 24 and a feed-horn assembly 26 for receiving the signals reflected and concentrated by the dish. Those skilled in the art will readily appreciate that the feed-horn assembly 26 includes a probe, which is not shown in FIG. 2, for picking up the signal received by the antenna. The probe feeds the signal to signal processing equipment for extracting information from the received signal. This signal processing equipment is well known in the art and does not form a part of this invention. Also, those skilled in the art will appreciate that numerous types of assemblies may be used alternatively to the feed-horn assembly 26 for collecting signals reflected by the dish 24.

The first antenna 16 includes an antenna centerline 28. The total reception range for antenna 16 shall be referred to in this disclosure and the accompanying claims as the "satellite" or "first" directional reception range, and is equal to two times the reception range d max measured from the antenna centerline 28. Signals propagating in a direction outside of this satellite directional reception range or aperture about the antenna centerline 28 from user location 14 cannot be received by the first antenna 16.

Referring still to FIG. 2, the antenna structure 22 at the user location 14 further includes the separate second antenna 18 for receiving the terrestrially transmitted signals. The second antenna 18 is shown as a feed-horn type antenna, however, those skilled in the art will readily appreciate that the second antenna may include a circular wave guide antenna, flat plate antenna, slot antenna, dipole antenna or multi-dipole antenna. Regardless of the antenna type, the antenna will include a suitable signal pick-up assembly for picking up the signal received by the antenna and feeding the signal to suitable signal processing equipment. This processing equipment is separate from the processing equipment for processing the signals received by the first antenna 16. Also, although the second antenna 18 is shown connected to the same structure as the first antenna 16, the first and second antennas may be completely separate. In any event, the second antenna 18 is preferably rotatable about a vertical axis as shown at B in FIG. 2 to direct the antenna for optimally receiving the terrestrial transmitted signals.

As with the first antenna 16, the second antenna 18 includes a centerline 30 and may receive signals travelling only within a directional reception range r max. about the antenna centerline 30. The total reception range for second antenna 18 shall be referred to in this disclosure and the accompanying claims as the "terrestrial" or "second" directional reception range, and is equal to two times the reception range r max. Signals traveling to user location 14 along a route outside that terrestrial directional reception range cannot be received by the second antenna 18.

Referring again to FIG. 1, the first antenna 16 according to the invention, is directed to receive signals from one of the satellites, satellite 12d for example. The azimuth and elevation at which the first antenna 16 must be directed for optimally receiving signals from satellite 12d may be 247.3 and 25.7 respectively, for example. The second antenna 18 is directed with its centerline 30 pointing generally to the terrestrial transmitting location of the terrestrial transmitter 20 and essentially horizontally. Ignoring the elevation difference between the first and second antennas 16 and 18, respectively, the azimuth difference between the centerlines 28 and 30 of the two antennas and this example is approximately 67.7 degrees.

In the orientation shown in FIG. 1, the first antenna 16 cannot receive signals from the terrestrial transmitter 20. The reason for this is that the directional signals transmitted from the terrestrial transmitter 20 are all travelling in a direction or along a route outside of the satellite directional reception range of the first antenna 16. Similarly, the direction in which the satellite 12d transmits with respect to the user location 14 is outside of the terrestrial directional reception range of the second antenna 18. Thus, the second antenna 18 cannot 22 receive signals transmitted by the satellite 12d. Furthermore, in this example, the second antenna 18 cannot receive any signals transmitted by any of the satellites 12a–d. Thus, in the orientation of the first and second antenna 16 and 18 as shown in FIG. 1 and with the position of the satellites 12a–d and terrestrial transmitter 20, the terrestrial transmitter may transmit on a frequency identical to the frequency of signals transmitted by the satellites without any interference in the signals received at the two antennas.

Those skilled in the art will readily appreciate that the elevation of the first antenna 16 may be high enough with respect to horizontal so that the second antenna 18 may be aligned along the same azimuth as the first antenna without any interference between the signals received by the two antennas on the identical frequency. However, where there are numerous satellites at different azimuths and elevations with respect to the user location 14, the first and second antennas 16 and 18 may have to be positioned at different azimuths as illustrated in FIG. 1 in order to prevent interference.

Figure 3:
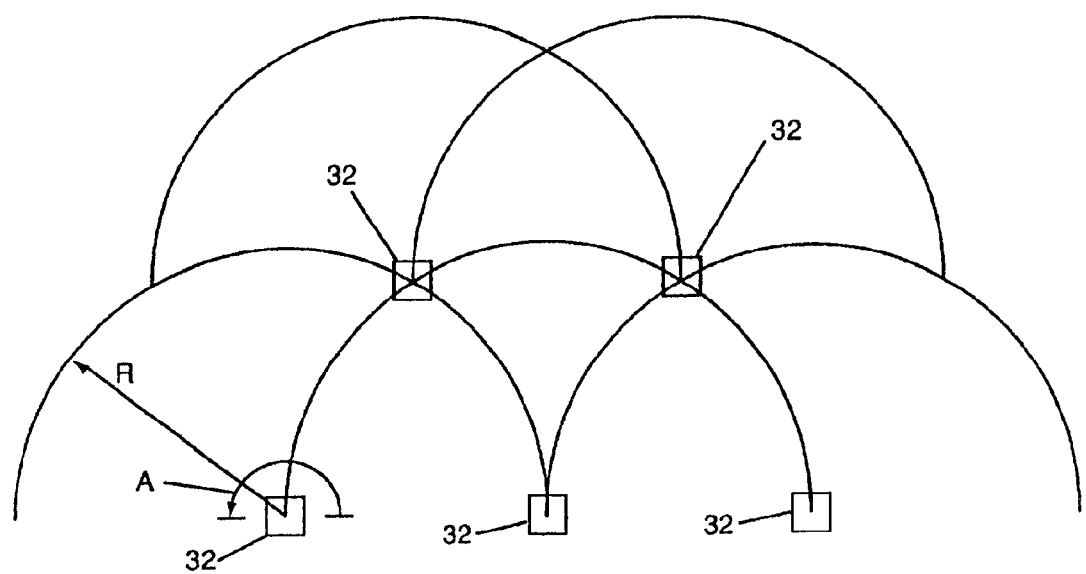
FIG. 3 is a schematic representation of the spacing for a number of terrestrial transmitters required to allow reception over a large geographic area.

Referring to FIG. 3, a plurality of terrestrial transmitters 32 are required to provide a signal strong enough to be received over a large area. Each transmitter 32 in FIG. 3 transmits directionally in an azimuth range A of approximately 180 degrees and out to an effective reception range R. With this transmitter spacing and transmission range, the signals from the terrestrial transmitters may be received from any location within the geographic area G. Although the directional range of 180 degrees is shown for purposes of example, the terrestrial transmissions may be in other ranges within the scope of this invention.

The method according to the invention is used in situations in which satellite signals are being transmitted in a first frequency for reception with the first antenna 16. The first antenna 16 is adapted to receive signals only within the satellite directional reception range about the antenna centerline 28. The method includes transmitting signals at the first frequency directionally in a range outside of the satellite directional reception range of the first antenna 16. Signals transmitted by the terrestrial transmitter are received by the second antenna 18 at the user location 14. The second antenna 18 is adapted to receive signals only within the terrestrial directional reception range about the antenna centerline 30.

This directional terrestrial transmission according to the invention allows terrestrial transmission at an identical frequency as that used by satellites, and particularly DBS without interference between the two transmissions. This allows the DBS spectrum and perhaps other satellite spectra to be reused for terrestrial transmissions. The terrestrial transmissions may be for television signals or any other data, including internet communications, voice data, other video, or any other type of data.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. An apparatus for simultaneously transmitting terrestrial signals on a common frequency with satellite signals transmitted from a satellite, the satellite transmitting satellite signals at a first frequency to a user location for reception only within a satellite directional reception range about the user location, the apparatus comprising:

(a) a directional terrestrial transmitter for transmitting terrestrial signals at the first frequency in a limited azimuth range around the location of the terrestrial transmitter, the terrestrial transmitter being located with respect to the user location such that the terrestrial transmitter transmits to the user location along a route which is outside of the satellite directional reception range.

2. The apparatus of claim 1 wherein satellite signals are transmitted from a plurality of satellites in geosynchronous orbit, each satellite separated from each other satellite in a geosynchronous arc by an angle greater than one half of the satellite directional reception range and the satellites together transmit satellite signals to the user location only within a combined satellite signal transmission range about the user location, and wherein:

(a) the terrestrial transmitter transmits only in directions which are outside of the combined satellite signal transmission range and an angle equal to one half of the satellite directional reception range outside of the boundaries of the combined satellite signal transmission range.

3. The apparatus of claim 2 further comprising:

(a) a plurality of terrestrial directional transmitters, each transmitting from a different terrestrial transmission location and each transmitting directionally in a limited azimuth range.

4. The apparatus of claim 1 wherein the first frequency is in a range of 12.2 gigahertz to 12.7 gigahertz.

5. The apparatus of claim 1 wherein the first frequency is above 12.2 gigahertz.

6. The apparatus of claim 1 wherein the satellite directional reception range is approximately eighteen (18) degrees.

7. A method for simultaneously providing terrestrial signals on a common frequency with satellite signals transmitted from a satellite, where the satellite is transmitting at a first frequency along a satellite transmission axis extending from the satellite to a terrestrial user location, the method comprising the steps of:

(a) transmitting terrestrial signals at the first frequency in a limited azimuth range from a terrestrial transmitter, the terrestrial transmitter being located with respect to the user location so as to transmit to the user location along a transmission route which is outside of a satellite directional reception range about the user location, wherein the satellite directional reception range comprises a limited directional range substantially centered on the satellite 2 transmission axis.

8. The method of claim 7 further comprising the step of:
(a) transmitting terrestrial signals at the first frequency and within a limited terrestrial azimuth range from a plurality of terrestrial transmitters at different locations.

9. The method of claim 7 wherein the first frequency is in the range of 12.2 gigahertz to 12.7 gigahertz.

10. The method of claim 7 wherein the first frequency is above 12.2 gigahertz.

11. The method of claim 7 wherein the satellite directional reception range is approximately eighteen (18) degrees.

12. An apparatus for facilitating the use of terrestrial transmitted signals which are transmitted on a common frequency simultaneously with satellite signals transmitted from a satellite, the satellite transmitting satellite signals at a first frequency to a terrestrial user location along a satellite transmission axis, the apparatus comprising:
(a) a terrestrial transmitter for transmitting terrestrial signals at the first frequency to the user location, the terrestrial transmitter being located with respect to the user location such that the terrestrial transmitter transmits to the user location along a route which is outside of a satellite directional reception range about the user location, wherein the satellite directional reception range comprises a limited directional range substantially centered on the satellite transmission axis; and
(b) a terrestrial receiving antenna at the user location for receiving signals at the first frequency only within a terrestrial directional reception range about a centerline of the terrestrial antenna, the terrestrial antenna being aligned to receive signals transmitted at the first frequency from the terrestrial transmitter location, and being aligned so that the satellite transmission axis is outside of the terrestrial directional reception range.

13. The apparatus of claim 12 wherein satellite signals are transmitted from a plurality of satellites in geosynchronous orbit, each satellite separated from each other satellite in a geosynchronous arc by an angle greater than an angle equal to one half of the satellite directional reception range and the satellites together transmit satellite signals to the user location only within a combined satellite signal transmission range about the user location, and wherein:
(a) the terrestrial transmitter transmits only in directions which are outside of the combined satellite signal transmission range and an angle equal to one half of the satellite directional reception range outside of the boundaries of the combined satellite signal transmission range.

14. The apparatus of claim 13 further comprising:
(a) a plurality of terrestrial transmitters each transmitting from a different terrestrial transmission location and each transmitting directionally in a limited azimuth range.

15. The apparatus of claim 12 wherein the first frequency is in a range of 12.2 gigahertz to 12.7 gigahertz.

16. The apparatus of claim 12 wherein the first frequency is above 12.2 gigahertz.

17. The apparatus of claim 12 wherein the satellite directional reception range is approximately eighteen (18) degrees.

18. An apparatus for simultaneously transmitting terrestrial signals on a common frequency with satellite signals transmitted from a satellite, the satellite transmitting satellite signals at a first frequency to a user location for reception only within a satellite directional reception range about the user location, the apparatus comprising:
(a) a terrestrial transmitter for transmitting terrestrial signals at the first frequency from a fixed terrestrial location which forms a fixed geometry with the user location and the satellite, the terrestrial transmitter being located with respect to the user location such that the terrestrial transmitter transmits to the user location along a route which is outside of the satellite directional reception range about the user location.

19. The apparatus of claim 18 wherein satellite signals are transmitted from a plurality of satellites in geosynchronous orbit, each satellite separated from each other satellite in a geosynchronous arc by an angle greater than one half of the satellite directional reception range and the satellites together transmit satellite signals to the user location only within a combined satellite signal transmission range about the user location, and wherein:
(a) the terrestrial transmitter transmits only in directions which are outside of the combined satellite signal transmission range and an angle equal to one half of the satellite directional reception range outside of the boundaries of the combined satellite signal transmission range.

20. The apparatus of claim 18 further comprising:
(a) a plurality of terrestrial transmitters, each transmitting from a different fixed terrestrial transmission location which forms a fixed geometry with the satellite and the user location.

21. The apparatus of claim 18 wherein the first frequency is in a range of 12.2 gigahertz to 12.7 gigahertz.

22. The apparatus of claim 18 wherein the first frequency is above 12.2 gigahertz.

23. The apparatus of claim 18 wherein the satellite directional reception range is approximately eighteen (18) degrees.

* * * * *

UNITED STATES PATENT AND TRADEMARK OFFICE
CERTIFICATE OF CORRECTION

PATENT NO.    : 6,892,050 B1
DATED         : May 10, 2005
INVENTOR(S)   : Carmen Tawil and Saleem Tawil It is certified that error appears in the above-identified patent and that said Letters Patent is hereby corrected as shown below:

Column 5,
Line 62, change "Sig nals" to -- Signals --.

Column 6, line 18 through Column 8, line 53,
Replace the claims with the following set of claims:

1. An apparatus for simultaneously transmitting terrestrial signals on a common frequency with satellite signals transmitted from a satellite, the satellite transmitting satellite signals at a first frequency to a user location for reception within a satellite directional reception range about the user location, the apparatus comprising:
(a) a terrestrial transmitter for transmitting terrestrial signals at the first frequency, the terrestrial transmitter being located with respect to the user location such that the terrestrial transmitter transmits to the user location along a route which is outside of the satellite directional reception range.

2. The apparatus of claim 1 wherein satellite signals are transmitted from a plurality of satellites in geosynchronous orbit, each satellite separated from each other satellite in a geosynchronous arc by an angle greater than one half of the satellite directional reception range and the satellites together transmit satellite signals to the user location within a combined satellite signal transmission range about the user location, and wherein:
(a) the terrestrial transmitter transmits only in directions which are outside of the combined satellite signal transmission range and an angle equal to one half of the satellite directional reception range outside of the boundaries of the combined satellite signal transmission range.

3. The apparatus of claim 2 further comprising:
(a) a plurality of terrestrial transmitters, each transmitting signals at the first frequency from a different terrestrial transmission location.

4. The apparatus of claim 1 wherein the first frequency is in a range of 12.2 gigahertz to 12.7 gigahertz.

5. The apparatus of claim 1 wherein the first frequency is above 12.2 gigahertz.

6. The apparatus of claim 1 wherein the satellite directional reception range is approximately eighteen (18) degrees.

7. A method for simultaneously providing terrestrial signals on a common frequency with satellite signals transmitted from a satellite, where the satellite is transmitting at a first frequency along a satellite transmission axis extending from the satellite to a terrestrial user location, the method comprising the steps of:
(a) transmitting terrestrial signals at the first frequency from a terrestrial transmitter, the terrestrial transmitter being located with respect to the user location so as to transmit to the user location along a transmission route which is outside of a satellite directional reception range about the user location, wherein the satellite directional reception range comprises a limited directional range encompassing the satellite transmission axis.

8. The method of claim 7 further comprising the step of:
(a) transmitting terrestrial signals at the first frequency from a plurality of terrestrial transmitters at different terrestrial locations.

9. The method of claim 7 wherein the first frequency is in the range of 12.2 gigahertz to 12.7 gigahertz.

10. The method of claim 7 wherein the first frequency is above 12.2 gigahertz.

11. The method of claim 7 wherein the satellite directional reception range is approximately eighteen (18) degrees.

UNITED STATES PATENT AND TRADEMARK OFFICE
CERTIFICATE OF CORRECTION

PATENT NO. : 6,892,050 B1
DATED : May 10, 2005
INVENTOR(S) : Carmen Tawil and Saleem Tawil It is certified that error appears in the above-identified patent and that said Letters Patent is hereby corrected as shown below:

<u>Column 6, line 18 through Column 8, line 53 (cont'd),</u>

12. An apparatus for facilitating the use of terrestrial transmitted signals which are transmitted on a common frequency simultaneously with satellite signals transmitted from a satellite, the satellite transmitting satellite signals at a first frequency to a terrestrial user location along a satellite transmission axis, the apparatus comprising:
(a) a terrestrial transmitter for transmitting terrestrial signals at the first frequency to the user location, the terrestrial transmitter being located with respect to the user location such that the terrestrial transmitter transmits to the user location along a route which is outside of a satellite directional reception range about the user location, wherein the satellite directional reception range comprises a limited directional range encompassing the satellite transmission axis; and
(b) a terrestrial receiving antenna at the user location for receiving signals at the first frequency only within a limited terrestrial directional reception range about the terrestrial antenna, the terrestrial antenna being aligned so that the terrestrial directional reception range encompasses the route from the terrestrial transmitter location to the user location, and being aligned so that the satellite transmission axis is outside of the terrestrial directional reception range.

13. The apparatus of claim 12 wherein satellite signals are transmitted from a plurality of satellites in geosynchronous orbit, each satellite separated from each other satellite in a geosynchronous arc by an angle greater than an angle equal to one half of the satellite directional reception range and the satellites together transmit satellite signals to the user location within a combined satellite signal transmission range about the user location, and wherein:
(a) the terrestrial transmitter transmits only in directions which are outside of the combined satellite signal transmission range and an angle equal to one half of the satellite directional reception range outside of the boundaries of the combined satellite signal transmission range.

14. The apparatus of claim 13 further comprising:
(a) a plurality of terrestrial transmitters each transmitting from a different terrestrial transmission location.

15. The apparatus of claim 12 wherein the first frequency is in a range of 12.2 gigahertz to 12.7 gigahertz.

16. The apparatus of Claim 12 wherein the first frequency is above 12.2 gigahertz.

17. The apparatus of Claim 12 wherein the satellite directional reception range is approximately eighteen (18) degrees.

18. An apparatus for simultaneously transmitting terrestrial signals on a common frequency with satellite signals transmitted from a satellite, the satellite transmitting satellite signals at a first frequency to a user location for reception within a satellite directional reception range about the user location, the apparatus comprising:
(a) a terrestrial transmitter for transmitting terrestrial signals at the first frequency from a fixed terrestrial location which forms a fixed geometry with the user location and the satellite, the terrestrial transmitter being located with respect to the user location such that the terrestrial transmitter transmits to the user location along a route which is outside of the satellite directional reception range about the user location.

19. The apparatus of Claim 18 wherein satellite signals are transmitted from a plurality of satellites in geosynchronous orbit, each satellite separated from each other satellite in a geosynchronous arc by an angle greater than one half of the satellite directional reception range and the satellites together transmit satellite signals to the user location within a combined satellite signal transmission range about the user location, and wherein:
(a) the terrestrial transmitter transmits only in directions which are outside of the combined satellite signal transmission range and an angle equal to one half of the satellite directional reception range outside of the boundaries of the combined satellite signal transmission range.

UNITED STATES PATENT AND TRADEMARK OFFICE
CERTIFICATE OF CORRECTION

PATENT NO. : 6,892,050 B1
DATED : May 10, 2005
INVENTOR(S) : Carmen Tawil and Saleem Tawil It is certified that error appears in the above-identified patent and that said Letters Patent is hereby corrected as shown below:

<u>Column 6, line 18 through Column 8, line 53 (cont'd),</u>

20. The apparatus of Claim 18 further comprising:
(a) a plurality of terrestrial transmitters, each transmitting from a different fixed terrestrial transmission location which forms a fixed geometry with the satellite and the user location.

21. The apparatus of Claim 18 wherein the first frequency is in a range of 12.2 gigahertz to 12.7 gigahertz.

22. The apparatus of Claim 18 wherein the first frequency is above 12.2 gigahertz.

23. The apparatus of Claim 18 wherein the satellite directional reception range is approximately eighteen (18) degrees.

24. An apparatus for simultaneously broadcasting terrestrial signals to a first terrestrial broadcast service area on a common frequency with satellite signals transmitted from a satellite, the satellite transmitting satellite signals at a first frequency to a number of user locations within the first terrestrial broadcast service area for reception within a satellite directional reception range about each respective user location, the apparatus comprising:
(a) a terrestrial transmitter for broadcasting terrestrial signals at the first frequency to the first terrestrial broadcast service area, the terrestrial transmitter being located with respect to each respective user location in the first terrestrial broadcast service area such that the terrestrial transmitter broadcasts to the respective user location along a route which is outside of the satellite directional reception range about the respective user location.

25. The apparatus of Claim 24 wherein the satellite signals are transmitted in a digital format.

26. The apparatus of Claim 24 wherein the route along which the terrestrial transmitter broadcasts to each respective user location is at a terrestrial reception elevation with respect to the respective user location which is above or below the elevation of each direction within the satellite directional reception range about the respective user location.

27. The apparatus of Claim 24 wherein satellite signals are transmitted from a plurality of satellites in geosynchronous orbit, each satellite separated from each other satellite in a geosynchronous arc by an angle greater than one half of the satellite directional reception range and the satellites together transmit satellite signals to each user location in the first terrestrial broadcast service area within a combined satellite signal transmission range about each respective user location, and wherein:
(a) the terrestrial transmitter broadcasts only in directions which are outside of the combined satellite signal transmission range and an angle equal to one half of the satellite directional reception range outside of the boundaries of the combined satellite signal transmission range at each respective user location.

28. The apparatus of Claim 27 wherein the satellite is transmitting at the first frequency along a number of additional satellite transmission axes each extending from the satellite to one of a number of additional terrestrial user locations within a combined terrestrial broadcast service area which includes the first terrestrial broadcast service area, and further comprising:
(a) a plurality of additional terrestrial transmitters, each broadcasting signals at the first frequency from a different terrestrial broadcasting location to a portion of the combined terrestrial broadcast service area, each additional terrestrial transmitter being located with respect to each respective user location in the respective portion of the combined terrestrial broadcast service area to which the respective additional transmitter broadcasts such that the respective additional terrestrial transmitter broadcasts to the respective user location along a route which is outside of the satellite directional reception range about the respective user location.

UNITED STATES PATENT AND TRADEMARK OFFICE
CERTIFICATE OF CORRECTION

PATENT NO.    : 6,892,050 B1
DATED         : May 10, 2005
INVENTOR(S)   : Carmen Tawil and Saleem Tawil It is certified that error appears in the above-identified patent and that said Letters Patent is hereby corrected as shown below:

Column 6, line 18 through Column 8, line 53 (cont'd),

29. A method for simultaneously broadcasting terrestrial signals on a common frequency with satellite signals transmitted from a satellite, where the satellite is transmitting at a first frequency along a satellite transmission axis extending from the satellite to a number of terrestrial user locations within a first terrestrial broadcast service area, the method comprising the steps of:
 (a) broadcasting terrestrial signals at the first frequency from a terrestrial transmitter to the first terrestrial broadcast service area, the terrestrial transmitter being located with respect to each respective user location so as to broadcast to the respective user location along a transmission route which is outside of a satellite directional reception range about the respective user location, wherein the satellite directional reception range comprises a limited directional range encompassing the satellite transmission axis.

30. The method of Claim 29 wherein the satellite signals are transmitted in a digital format.

31. The method of Claim 29 wherein the route along which the terrestrial transmitter broadcasts to each respective user location is at a terrestrial reception elevation with respect to the respective user location which is above or below the elevation of each direction within the satellite directional reception range about the respective user location.

32. The method of Claim 29 wherein the satellite is transmitting at the first frequency along a number of additional satellite transmission axes each extending from the satellite to one of a number of additional terrestrial user locations within a combined terrestrial broadcast service area which includes the first terrestrial broadcast service area, and further comprising the step of:
 (a) broadcasting terrestrial signals at the first frequency to the combined terrestrial broadcast service area from a plurality of additional terrestrial transmitters at different terrestrial locations, each additional terrestrial transmitter broadcasting to a respective portion of the combined terrestrial broadcast service area and being located with respect to each respective user location in that respective portion of the combined terrestrial broadcast service area so as to broadcast to the respective user location along a transmission route which is outside of the satellite directional reception range about the respective user location.

33. An apparatus for simultaneously broadcasting terrestrial signals on a common frequency with satellite signals transmitted from a satellite, the satellite transmitting satellite signals at a first frequency to a number of user locations in a first terrestrial broadcast service area for reception within a satellite directional reception range about each respective user location, the apparatus comprising:
 (a) a terrestrial transmitter for broadcasting terrestrial signals to the first terrestrial broadcast service area at the first frequency from a fixed terrestrial location which forms a fixed geometry with each respective user location and the satellite, the terrestrial transmitter being located with respect to each respective user location such that the terrestrial transmitter broadcasts to the respective user location along a route which is outside of the satellite directional reception range about the respective user location.

34. The apparatus of Claim 33 wherein the satellite signals are transmitted in a digital format.

35. The apparatus of Claim 33 wherein the route along which the terrestrial transmitter broadcasts to each respective user location is at a terrestrial reception elevation with respect to the respective user location which is above or below the elevation of each direction within the satellite directional reception range about the respective user location.

36. The apparatus of Claim 33 wherein satellite signals are transmitted from a plurality of satellites in geosynchronous orbit, each satellite separated from each other satellite in a geosynchronous arc by an angle greater than one half of the satellite directional reception range and the satellites together transmit satellite signals to each respective user location within a combined satellite signal transmission range about the respective user location, and wherein:
 (a) the terrestrial transmitter broadcasts only in directions which are outside of the combined satellite signal transmission range and an angle equal to one half of the satellite directional reception range outside of the boundaries of the combined satellite signal transmission range at the respective user location.

UNITED STATES PATENT AND TRADEMARK OFFICE
CERTIFICATE OF CORRECTION

PATENT NO. : 6,892,050 B1
DATED : May 10, 2005
INVENTOR(S) : Carmen Tawil and Saleem Tawil It is certified that error appears in the above-identified patent and that said Letters Patent is hereby corrected as shown below:

Column 6, line 18 through Column 8, line 53 (cont'd),

37. The apparatus of Claim 36 wherein the satellite is transmitting at the first frequency along a number of additional satellite transmission axes each extending from the satellite to one of a number of additional terrestrial user locations within a combined terrestrial broadcast service area which includes the first terrestrial broadcast service area, and further comprising:
(a) a plurality of additional terrestrial transmitters, each broadcasting to a portion of the combined terrestrial broadcast service area from a different fixed terrestrial transmission location which forms a fixed geometry with the satellite and each respective user location in the respective portion of the combined terrestrial broadcast service area, each additional terrestrial transmitter being located with respect to each respective user location to which the respective additional terrestrial transmitter broadcasts such that the respective additional terrestrial transmitter broadcasts to the respective user location along a route which is outside of the satellite directional reception range about the respective user location.

Signed and Sealed this

Twenty-third Day of August, 2005

JON W. DUDAS
*Director of the United States Patent and Trademark Office*